US006899825B2

(12) United States Patent
Matsuda et al.

(10) Patent No.: US 6,899,825 B2
(45) Date of Patent: May 31, 2005

(54) BIVALENT METAL SILICATE PHOSPHOR AND PROCESS FOR ITS PRODUCTION, AND A PHOSPHOR PASTE COMPOSITION AND A VACUUM ULTRAVIOLET RAY EXCITATION TYPE LIGHT-EMITTING DEVICE EMPLOYING SUCH A PHOSPHOR

(75) Inventors: Kouhei Matsuda, Kanagawa (JP); Takayuki Hisamune, Kanagawa (JP)

(73) Assignee: Kasei Optonix, Ltd., Odawara (JP)

( * ) Notice: Subject to any disclaimer, the term of this patent is extended or adjusted under 35 U.S.C. 154(b) by 92 days.

(21) Appl. No.: 10/391,627

(22) Filed: Mar. 20, 2003

(65) Prior Publication Data

US 2004/0027047 A1 Feb. 12, 2004

(30) Foreign Application Priority Data

| Mar. 22, 2002 | (JP) | ......................................... 2002-124997 |
| May 23, 2002 | (JP) | ......................................... 2002-186899 |
| Oct. 10, 2002 | (JP) | ......................................... 2002-332900 |
| Jan. 30, 2003 | (JP) | ......................................... 2003-060646 |

(51) Int. Cl.$^7$ .......................... C09K 11/59; H01J 11/02

(52) U.S. Cl. ...................... 252/301.4 F; 252/301.6 F; 313/582; 313/584; 313/646; 313/486

(58) Field of Search .................... 252/301.4 F, 301.6 F; 313/582, 584, 643, 486

(56) References Cited

U.S. PATENT DOCUMENTS

| 3,544,481 A | * | 12/1970 | Barry ..................... 252/301.4 F |
| 5,951,915 A | * | 9/1999 | Hase et al. ............ 252/301.4 F |
| 6,093,346 A | * | 7/2000 | Xiao et al. ............. 252/301.4 F |
| 2002/0038861 A1 | * | 4/2002 | Toda et al. ............ 252/301.4 F |
| 2003/0111643 A1 | * | 6/2003 | Ono et al. ............. 252/301.4 F |
| 2004/0080271 A1 | * | 4/2004 | Aoki et al. .................. 313/582 |

FOREIGN PATENT DOCUMENTS

| GB | 2171112 | * | 8/1986 |
| JP | 2002-285147 | | 10/2002 |
| JP | 2002-332481 | | 11/2002 |

OTHER PUBLICATIONS

H. Takayuki, Electronic Materials, vol. 12, pp. 45–49, "Phosphor for PDP", 1997 (with English Abstract).
R. Yoshimatsu, et al., Asia Display/IDW '01, Proceedings of The 21$^{st}$ International Display Research Conference in conjunction with The 8$^{th}$ International Display Workshops, pp. 1115–1118, "Feasibility Study of Silicate Phosphor CaMgSi$_2$ O$_6$:Eu$^{2+}$ As Blue PDP Phosphors".
T. Kunimoto, et al., Extended Abstracts of 6$^{th}$ Int. Conf. Science and Technology of Display Phosphors, pp. 21–24, "Blue and Red Emitting Eu Activated CaMgSi$_2$O$_6$ Phosphors for VUV Excitation", 2000.
E. Hata, et al., The Institute of Electronics, Information and Communication Engineers, Technical Report of IEICE, EID2002–65, vol. 102, No. 467, pp. 9–12, "Luminescent Characterisitics of CaMgSi$_2$O$_6$ Phosphors Doped With Several Rare Earth Elements", Nov. 2002.

* cited by examiner

*Primary Examiner*—C. Melissa Koslow

(74) *Attorney, Agent, or Firm*—Oblon, Spivak, McClelland, Maier & Neustadt, P.C.

(57) ABSTRACT

A blue-emitting bivalent metal silicate phosphor improved in the luminance efficiency, the durability against deterioration by VUV and the powder characteristic, and a process for its production, a phosphor paste composition employing such an improved phosphor, and a VUV excitation type light-emitting device having high luminance. The phosphor is an Eu-activated bivalent metal silicate phosphor represented by the compositional formula CaMgSi$_2$O$_6$:Eu, wherein a specific amount of at least one member among La, Ba, Sr, Zn, Y, Ce, In, Bi, chlorine, bromine and iodine, is contained in the crystalline matrix.

26 Claims, 1 Drawing Sheet

BIVALENT METAL SILICATE PHOSPHOR AND PROCESS FOR ITS PRODUCTION, AND A PHOSPHOR PASTE COMPOSITION AND A VACUUM ULTRAVIOLET RAY EXCITATION TYPE LIGHT-EMITTING DEVICE EMPLOYING SUCH A PHOSPHOR

BACKGROUND OF THE INVENTION

1. Field of the Invention

The present invention relates to a bivalent metal silicate phosphor which emits a blue color under excitation by ultraviolet rays (UV) or vacuum ultraviolet rays (VUV) having a wavelength of at most 200 nm, and a process for its production, as well as a phosphor paste composition containing such a phosphor, a vacuum ultraviolet ray excitation type light-emitting device (VUV excitation type light-emitting device) and a fluorescent lamp.

2. Discussion of Background

In recent years, there have been various research and development activities on a VUV excitation type light-emitting device of a structure in which a rare gas such as Ar, Xe, He, Ne or a gas mixture thereof, is sealed in an envelop formed of e.g. glass, and a phosphor layer made of a phosphor for VUV formed inside of the envelop, is excited by VUV generated by discharge of such a rare gas, to emit light, as represented by e.g. a plasma display panel (PDP) or a rare gas lamp to be used, for example, as a light source for reading by a scanner.

In a rare gas lamp as a typical example of such a VUV excitation type light-emitting device, a rare gas such as Xe or Xe-Ne is sealed in a glass tube, and on the inner wall surface of such a tube, a phosphor layer made of a phosphor for VUV, which emits light when excited by VUV, is formed. When an electrical energy is applied between electrodes of such a rare gas lamp, discharge of the rare gas takes place in such a glass tube, and the phosphor layer formed on the inner wall surface of the tube, will be excited by VUV thereby generated, to emit visible light.

Whereas, PDP as another typical example of the VUV excitation type light-emitting device, can be in principle regarded to be one wherein the above-mentioned VUV excitation type rare gas lamp is further downsized, and such downsized rare gas lamps of different three colors are arranged in stripes or matrices. Namely, it is one having restricted discharge spaces (cells) arranged in stripes or matrices. Each cell is provided with electrodes, and a phosphor layer made of a phosphor for VUV, is formed inside of each cell. A rare gas such as Xe, Xe-Ne, He-Xe or He-Ne-Xe, is sealed in each cell, so that when an electrical energy is applied from the electrodes in the cell, discharge of the rare gas takes place in the cell to generate VUV, whereupon the phosphor layer in the cell will be excited by this VUV to emit visible light, and by this emitted light, an image will be displayed. In a case of full color PDP, cells having phosphor layers made of phosphors which emit red, blue and green, respectively, under VUV excitation, are arranged in stripes or matrices, whereby full color display can be carried out.

As the phosphors for forming phosphor layers for such VUV excitation type light-emitting devices, red-emitting phosphors such as $(Y,Gd)BO_3$:Eu, green-emitting phosphors such as $LaPO_4$:Ce,Tb, $(Ba,Sr)MgAl_{10}O_{17}$:Eu,Mn and $Zn_2SiO_4$:Mn, and blue-emitting phosphors such as $BaMgAl_{10}O_{17}$:Eu, are, for example, used alone or in combination as a mixture depending upon the desired color for emission (see Journal of Electronic Material, December 1997 issue, Kogyo Chousa K.K., etc.). Among such phosphors for VUV which are practically used for phosphor layers of VUV excitation type light-emitting devices, a phosphor which is practically used mainly as a blue-emitting component, is an aluminate phosphor so-called BAM having a composition of $BaMgAl_{10}O_{17}$:Eu. This BAM phosphor has a high luminance brightness when excited under irradiation by VUV, and the color purity as a blue color is excellent. However, it has drawbacks such that the deterioration of luminance in the baking step (the deterioration by baking) in the formation of the phosphor layer for a VUV excitation type light-emitting device employing this phosphor, is substantial, and the deterioration with time of the luminance brightness when exposed to VUV for a long period of time by driving the VUV excitation type light-emitting device (deterioration by VUV) is substantial.

Accordingly, it is desired to develop a blue-emitting VUV excitation type phosphor which is less susceptible to deterioration by baking or by VUV. As a proposal to overcome such problems, a bivalent metal silicate phosphor containing Eu as an activator and having a composition represented by the formula $CaMgSi_2O_6$:Eu, has been reported as one of blue-emitting phosphors which are less susceptible to deterioration by baking and by VUV (see Proceedings of The 8th International Display Workshops 2001, pp. 1115). However, this phosphor has a problem that the luminance is low as compared with BAM being a conventional blue-emitting phosphor, and a study is being made to improve the luminance to a practical level.

Further, although this phosphor is said to be less susceptible to deterioration by baking or by VUV, it is not necessarily practically adequate especially with respect to deterioration by VUV, and a further improvement has been desired.

Further, with respect to the process for producing a phosphor, which is substantially influential over such a quality, it is disclosed as common to use, for the phosphor in question, $CaCO_3$ as a material for Ca, $MgCO_3$ or $3MgCO_3 \cdot Mg(OH)_2$ as a material for Mg, $SiO_2$ as a material for Si and $Eu_2O_3$ as a material for Eu. On the other hand, it is known that even if these materials are blended and baked, it is impossible to form a bivalent metal silicate phosphor having a composition represented by the formula $CaMgSi_2O_6$:Eu, which has an adequate emission intensity as a blue-emitting phosphor.

Whereas, as another method for producing such a bivalent metal silicate phosphor, it has been proposed to use $EuF_3$ instead of $Eu_2O_3$, and it is reported that a phosphor showing a relatively strong blue emission with high color purity, can be obtained (see Proceedings of The 8th International Display Workshops 2001, pp. 1115).

However, in order to form a sufficiently uniform and dense phosphor layer to be practically free from any problem for a VUV excitation type light-emitting device such as a rare gas lamp or PDP, it is necessary to let phosphor particles have proper powder characteristics. Specifically, the particle diameter D50 as measured by Coulter Counter Method is required to be at most 10 $\mu$m, preferably from about 1 to 7 $\mu$m, more preferably from about 1 to 4 $\mu$m, and further, with respect to the particle size distribution, $\sigma \log(L)$ and $\sigma \log(S)$ are desired to be at most 0.5. In a conventional process of employing $EuF_3$, the particle size of the phosphor particles thereby obtainable, tends to be too large, and it has been impossible to obtain phosphor particles having powder characteristics within a proper range to form a phosphor layer as mentioned above.

Further, with PDP of AC type, it is known that the discharge initiation voltage will be influenced and will change by the electrification tendency of the coated phosphor. For example, with BAM or (Y,GD)BO$_3$:Eu which tends to be positively electrified, the discharge initiation voltage tends to be low, while with Zn$_2$SiO$_4$:Mn which tends to be negatively electrified, the discharge initiation voltage tends to be high. From the aspect of a circuit, the lower the discharge initiation voltage, the better. CaMgSi$_2$O$_6$:Eu prepared by a conventional method, tends to be negatively electrified and thus requires a high voltage for the initiation of discharge. This is also one factor that CaMgSi$_2$O$_6$:Eu is not practically used for PDP. Here, the electrification tendency can be evaluated by measuring the blow off electrostatic charge of the material in question. Specifically, a phosphor powder and poval resin beads are mixed and shaked to let them undergo triboelectrification, whereby the blow off electrostatic charge is measured to evaluate the electrostatic charge of the phosphor powder.

SUMMARY OF THE INVENTION

The present invention has been made under these circumstances, and it is an object of the present invention to provide a blue-emitting bivalent metal silicate phosphor which has a higher luminance brightness than a conventional phosphor and improved durability against deterioration by VUV and which has a powder characteristic (a particle size characteristic) suitable for forming a phosphor layer for a VUV excitation type light-emitting device such as a rare gas lamp or PDP, and a process for its production, and a phosphor paste composition and a VUV excitation type light-emitting device employing such an improved phosphor.

The present inventors have added various elements to a silicate phosphor containing Eu as an activator, which is represented by the compositional formula CaMgSi$_2$O$_6$:Eu and have studied the effects thereof. As a result, they have succeeded in solving the above problems by adopting the following means and have accomplished the present invention. Namely, the present invention has the following constructions and includes the following tour embodiments i.e. the first to fourth embodiments.

First Embodiment

It has been found that when La is added in a specific amount to a bivalent metal silicate having a compositional formula of CaMgSi$_2$O$_6$:Eu, and it is incorporated to the composition, the luminance brightness will be increased particularly under excitation with VUV, and when a phosphor layer is formed by a phosphor paste composition employing such a phosphor, a VUV excitation type light-emitting device having the luminance of the blue-emitting component improved, can be obtained. The detailed constructions are as follows.

(1) A bivalent metal silicate phosphor which comprises, as matrix crystal, a silicate containing, as constituting metal elements, calcium (Ca), magnesium (Mg) and silicon (Si) and which is activated by Europium (Eu), wherein lanthanum (La) is contained in the composition of the phosphor.

(2) The bivalent metal silicate phosphor according to the above item (1), which is represented by the formula (Ca$_{1-x}$Eu$_x$)O·aMgO·bSiO$_2$·cLa$_2$O$_3$, wherein a, b, c and x are numbers satisfying the conditions of $0.9 \leq a \leq 1.1$, $1.9 \leq b \leq 2.2$, $0 < c \leq 2.5 \times 10^{-2}$ and $5 \times 10^{-3} \leq x \leq 0.1$, respectively.

(3) The bivalent metal silicate phosphor according to the above item (2), wherein said a, b and c are numbers satisfying the conditions of $a=1$, $b=2$ and $2.5 \times 10^{-4} \leq c \leq 1.5 \times 10^{-2}$, respectively.

(4) A phosphor paste composition having a phosphor dispersed in a solvent having a binder dissolved therein, wherein the phosphor is a bivalent metal silicate phosphor as defined in any one of the above items (1) to (3).

(5) A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in any one of the above items (1) to (3).

Second Embodiment

It has been found that only when the following specific metal elements are incorporated in specific amounts to a bivalent metal silicate having a compositional formula of CaMgSi$_2$O$_6$:Eu, deterioration by VUV is particularly reduced, and with a VUV excitation type light-emitting device having a phosphor layer formed of a phosphor paste composition containing such a phosphor, deterioration with time of the luminance during the driving will be less. The detailed constructions are as follows.

(6) A bivalent metal silicate phosphor which comprises, as matrix crystal, a silicate containing, as constituting metal elements, calcium (Ca), magnesium (Mg) and silicon (Si) and which is activated by Europium (Eu), wherein at least one member selected from the group consisting of barium (Ba), strontium (Sr), zinc (Zn), yttrium (Y), cerium (Ce), indium (In) and bismuth (Bi) is contained in the composition of the phosphor.

(7) The bivalent metal silicate phosphor according to the above item (6), which is represented by the formula (Ca$_{1-x-u}$Eu$_x$M$^{II}_u$)O·a(Mg$_{1-v}$Zn$_v$)O·bSiO$_2$·wM$^{III}$oxide, wherein M$^{II}$ is at least one metal element selected from the group consisting of barium (Ba) and strontium (Sr), M$^{III}$ is at least one metal element selected from the group consisting of yttrium (Y), cerium (Ce), Indium (In) and bismuth (Bi), and a, b, x, u, v and w are numbers satisfying $0.9 \leq a \leq 1.1$, $1.9 \leq b \leq 2.2$, $5 \times 10^{-3} \leq x \leq 10^{-1}$ and $0 < u+v+w \leq 4 \times 10^{-1}$, respectively.

(8) The bivalent metal silicate phosphor according to the above item (7), wherein said u, v and w are numbers satisfying the conditions of $0 \leq u \leq 2 \times 10^{-1}$, $0 \leq v \leq 10^{-1}$ and $0 \leq w \leq 10^{-1}$, respectively.

(9) A phosphor paste composition having a phosphor dispersed in a solvent having a binder dissolved therein, wherein the ph osphor is a bivalent metal silicate phosphor as defined in any one of the above items (6) to (8).

(10) A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in any one of the above items (6) to (8).

Third Embodiment

It has been found that the luminance brightness under excitation with VUV can be improved in a case where chlorine is incorporated in a specific amount to the matrix of an Eu-activated bivalent metal silicate phosphor having a compositional formula of CaMgSi$_2$O$_6$:Eu, or in a case where an Eu-activated bivalent metal silicate phosphor is produced by incorporating chlorine or a chlorine compound to a phosphor material in a step of baking the phosphor material at least once at a temperature of at least 800° C. Further, it has been also found that by the above specification for improvement, it has been made possible to produce a phosphor having a relatively small particle size suitable for forming a phosphor layer of a VUV excitation type light-emitting device, which used to be impossible by a conventional specification, and further in a case where the weight median particle diameter D50 of the phosphor particles is controlled to be at most 7 μm, and σ log(L) and σ log(S) are controlled to be at most 0.5, it is surprisingly possible to obtain a phosphor which tends to be positively electrified by blow off electrification.

Further, it has been found that by using a phosphor paste composition employing such an improved phosphor, it is possible to form a phosphor layer for a VUV excitation type light-emitting device, and a VUV excitation type light-emitting device having the luminance of the blue-emitting component improved, can be obtained. The detailed constructions are as follows.

(11) A bivalent metal silicate phosphor which has a basic composition represented by the formula $(Ca_{1-x-u}Eu_xM^{II}_u)O \cdot a(Mg_{1-v}Zn_v)O \cdot bSiO_2 \cdot wM^{III}oxide$, wherein $M^{II}$ is at least one metal element selected from the group consisting of barium (Ba) and strontium (Sr), $M^{III}$ is at least one metal element selected from the group consisting of lanthanum (La), yttrium (Y), cerium (Ce), indium (In) and bismuth (Bi), and a, b, x, u, v and w are numbers satisfying $0.9 \leq a \leq 1.1$, $1.9 \leq b \leq 2.2$, $5 \times 10^{-3} \leq x \leq 10^{-1}$ and $0 \leq u+v+w \leq 4 \times 10^{-1}$, respectively, and which contains chlorine.

(12) The bivalent metal silicate phosphor according to the above item (11), wherein the amount of chlorine contained in the phosphor is at most 20,000 ppm.

(13) The bivalent metal silicate phosphor according to the above item (11) or (12), wherein the weight median particle diameter D50 of the phosphor as measured by Coulter Counter Method is within a range of from 1 to 7 μm.

(14) The bivalent metal silicate phosphor according to the above item (13), wherein the weight median particle diameter D50 of the phosphor as measured by Coulter Counter Method is within a range of from 1 to 4 μm.

(15) The bivalent metal silicate phosphor according to the above item (13) or (14), wherein in the particle size distribution as measured by Coulter Counter Method, σ log (L) and σ log (S) are at most 0.5.

(16) The bivalent metal silicate phosphor according to any one of the above items (11) to (15), wherein the relative blow off electrostatic charge to a poval resin would be positive electrification.

(17) A process for producing a bivalent metal silicate phosphor as defined in any one of the above items (11) to (16), which comprises a step of baking the phosphor material at least once at a temperature of at least 800° C., wherein a chlorine compound or chlorine is incorporated to the phosphor material in that step.

(18) The process for producing a bivalent metal silicate phosphor according to the above item (17), wherein the amount of chlorine incorporated to the phosphor material is at least 0.001 wt %.

(19) The process for producing a bivalent metal silicate phosphor according to the above item (17) or (18), wherein ammonium chloride is used as the chlorine compound to be incorporated to the phosphor material.

(20) A phosphor paste composition having a phosphor dispersed in a solvent having a binder dissolved therein, wherein the phosphor is a bivalent metal silicate phosphor as defined in any one of the above items (11) to (16) or a bivalent metal silicate phosphor produced by the process as defined in any one of items (17) to (19).

(21) A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in any one of the above items (11) to (15) or a bivalent metal silicate phosphor produced by the process as defined in any one of the above items (17) to (19).

Fourth Embodiment

It has been found that the luminance brightness will be improved under excitation of VUV in a case where at least one of bromine and iodine is incorporated in a specific amount to the matrix of an Eu-activated bivalent metal silicate phosphor having a compositional formula $CaMgSi_2O_6$:Eu, or in a case where an Eu-activated bivalent metal silicate phosphor is produced by incorporating at least one of bromine, iodine, a bromine compound and an iodine compound to a phosphor material in a step of baking the phosphor material at least once at a temperature of at least 800° C. Further, it has been also found that by the above specification for improvement, it has been made possible to produce a phosphor having a relatively small particle size suitable for forming a phosphor layer of a VUV excitation type light-emitting device, which used to be impossible by a conventional specification, and in a case where the weight median particle diameter D50 of the phosphor particles is controlled to be at most 7 μm, and σ log(L) and σ log(S) are controlled to be at most 0.5, it is surprisingly possible to obtain a phosphor which tends to be positively electrified by blow off electrification.

Further, it has been found that by using a phosphor paste composition employing such an improved phosphor, it is possible to form a phosphor layer for a VUV excitation type light-emitting device, and a VUV excitation type light-emitting device having the luminance of the blue-emitting component improved, can be obtained. The detailed constructions are as follows.

(22) A bivalent metal silicate phosphor which has a basic composition represented by the formula $(Ca_{1-x-u}Eu_xM^{II}_u)O \cdot a(Mg_{1-v}Zn_v)O \cdot bSiO_2 \cdot wM^{III}oxide \cdot tCl$, wherein $M^{II}$ is at least one metal element selected from the group consisting of barium (Ba) and strontium (Sr), $M^{III}$ is at least one metal element selected from the group consisting of lanthanum (La), yttrium (Y), cerium (Ce), indium (In) and bismuth (Bi), and a, b, x, t, u, v and w are numbers satisfying $0.9 \leq a \leq 1.1$, $1.9 \leq b \leq 2.2$, $5 \times 10^{-3} \leq x \leq 10^{-1}$, $0 \leq t \leq 2 \times 10^{-1}$ and $0 \leq u+v+w \leq 4 \times 10^{-1}$, respectively, and which contains at least one of bromine and iodine.

(23) The bivalent metal silicate phosphor according to the above item (22), wherein the total amount of bromine and iodine contained in the phosphor is at most 20,000 ppm.

(24) The bivalent metal silicate phosphor according to the above item (22) or (23), wherein the weight median particle diameter D50 of the phosphor as measured by Coulter Counter Method is within a range of from 1 to 7 μm.

(25) The bivalent metal silicate phosphor according to the above item (24), wherein the weight median particle diameter D50 of the phosphor as measured by Coulter Counter Method is within a range of from 1 to 4 μm.

(26) The bivalent metal silicate phosphor according to the above item (24) or (25), wherein in the particle size distribution as measured by Coulter Counter Method, σ log (L) and σ log (S) are at most 0.5.

(27) The bivalent metal silicate phosphor according to any one of the above items (22) to (26), wherein the relative blow off electrostatic charge to a poval resin would be positive electrification.

(28) A process for producing a bivalent metal silicate phosphor as defined in any one of the above items (22) to (27), which comprises a step of baking the phosphor material at least once at a temperature of at least 800° C., wherein at least one member selected from the group consisting of bromine, iodine, a bromine compound and an iodine compound, is incorporated to the phosphor material in that step.

(29) The process for producing a bivalent metal silicate phosphor according to the above item (28), wherein the amount of bromine and iodine incorporated to the phosphor material is at least 0.001 wt %.

(30) The process for producing a bivalent metal silicate phosphor according to the above item (28) or (29), wherein ammonium bromide is used as the bromine compound, and ammonium iodide is used as the iodine compound, to be incorporated to the phosphor material.

(31) A phosphor paste composition having a phosphor dispersed in a solvent having a binder dissolved therein, wherein the phosphor is a bivalent metal silicate phosphor as defined in any one of the above items (22) to (27) or a bivalent metal silicate phosphor produced by the process as defined in any one of the above items (28) to (30).

(32) A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in any one of the above items (22) to (27) or a bivalent metal silicate phosphor produced by the process as defined in any one of the above items (28) to (30).

DETAILED DESCRIPTION OF THE PREFERRED EMBODIMENTS

Figure 1:
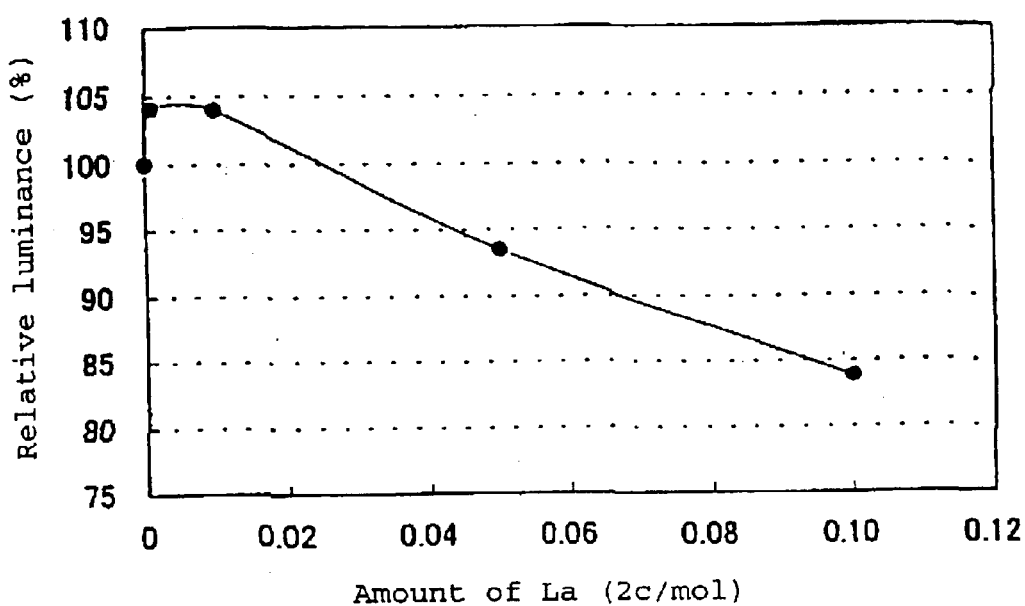
FIG. 1 is a graph showing the interrelation between the La content (c) and the resultant stimulus (luminance/y) of the luminescence of the phosphor with respect to the bivalent metal silicate phosphor of the present invention.

The phosphor of the present invention can be obtained by mixing materials i.e. oxides, etc. of the respective metal elements constituting the compositional formula of $CaMgSi_2O_6$:Eu and compounds, etc. containing specific elements in accordance with the purpose and the means of each of the four embodiments, in a prescribed ratio, followed by treatment at a high temperature in a specific atmosphere.

Now, the present invention will be described in detail with reference to the four embodiments i.e. the first to fourth embodiments of the present invention.

Firstly, the phosphor of the first embodiment of the present invention can be produced in the same manner as for a conventional bivalent metal silicate phosphor, i.e. in such a manner that Ca, Mg, Si and Eu which will constitute a phosphor, and La which is the feature of the present invention, are mixed in the form of oxides or in the form of metal compounds such as carbonates, sulfates or halides which can be converted to oxides at high temperatures, in such proportions as to form a mixture of phosphor materials having a composition which stoichiometrically corresponds to $(Ca_{1-x}Eu_x)O \cdot aMgO \cdot bSiO_2 \cdot cLa_2O_3$ (wherein x is a number satisfying the condition of $5 \times 10^{-3} \leq x \leq 0.1$, and a, b and c are numbers satisfying the conditions of $0.9 \leq a \leq 1.1$, $1.9 \leq b \leq 2.2$ and $0 < c \leq 2.5 \times 10^{-2}$, the same applies hereinafter), and the mixture is filled in a heat resistant container such as an alumina crucible and baked at least once in a reducing atmosphere at a temperature of from 1,000 to 1,400° C. over a period of from 2 to 40 hours, and the baked product is subjected to post treatments which are commonly carried out in the preparation of phosphors, such as dispersion, washing with water, drying and sieving. Further, a flux such as a fluoride may be added to the above mixture of phosphor materials before baking.

Thus, an Eu-activated bivalent metal silicate phosphor of the present invention having a composition represented by $(Ca_{1-x}Eu_x)O \cdot aMgO \cdot bSiO_2 \cdot cLa_2O_3$, is obtained.

Referring to FIG. 1, bivalent metal silicate phosphors of the above formula wherein a, b and x are 1.0, 2.0 and $2 \times 10^{-2}$, respectively, and the amount of La (value c) is different $((Ca_{0.98}Eu_{0.02})O \cdot MgO \cdot 2SiO_2 \cdot cLa_2O_3)$, were prepared, and the obtained phosphors were irradiated with VUV of 146 nm to emit lights. FIG. 1 is a graph showing resultant stimulus (luminance/y) of each phosphor by a relative value to the phosphor having no La added (value c=0).

The luminance of a blue-emitting phosphor substantially changes in proportion to its luminescent color (value y of the chromaticity point in the CIE color system chromaticity coordinates). Accordingly, as a simple method for comparing the luminescence efficiency among phosphors having different y values for their luminescent colors, it is common to compare by means of a luminance/y value (the resultant stimulus) obtained by dividing the luminance brightness by the value y. Accordingly, also in the present invention, the luminescence efficiency between the phosphors will be mutually compared by means of the resultant stimulus. In this specification, the luminance brightness or the luminance is meant for the "resultant stimulus" as defined above. In FIG. 1, the "relative luminance" on the ordinate is also a relative value of the resultant stimulus obtained with respect to each phosphor.

As is evident from FIG. 1, when a small amount of La is added to the conventional bivalent metal silicate phosphor $((Ca_{0.98}Eu_{0.02})O \cdot MgO \cdot 2SiO_2)$, the luminance brightness will be improved, but if the amount of La to be added is increased beyond a certain amount, the luminance brightness will gradually decrease as compared with the phosphor having no La incorporated. Further, although not shown in the drawing, it has been confirmed that also with a phosphor having a composition other than the composition wherein the proportion of MgO (value a) is 1.0, the proportion of $SiO_2$ (value b) is 2.0 and the concentration of Eu (value x) is $2 \times 10^{-2}$, when such a silicate phosphor is within a composition range whereby a desired luminance brightness is obtainable, there is an interrelation similar to FIG. 1 between the content of La (value c) and the luminance brightness of the phosphor under excitation by VUV.

Accordingly, with the bivalent metal silicate of the present invention, in a case where the content of La (value c) in the phosphor composition of the above compositional formula satisfies the condition of $0 < c \leq 2.5 \times 10^{-2}$, the luminance brightness under excitation with VUV is higher than the luminance brightness of a conventional bivalent metal silicate phosphor containing no La in the composition, and from the viewpoint of the luminance brightness, value c is more preferably within a range of from about $2.5 \times 10^{-4}$ to $1.5 \times 10^{-2}$. On the other hand, if the value c exceeds $1.5 \times 10^{-2}$, the effect to lower the luminance by the formation of a different phase tends to be larger than the effect to increase the luminance by the addition of La, such being undesirable.

Values a and b are preferably within ranges of $0.9 \leq a \leq 1.1$ and $1.9 \leq b \leq 2.2$, respectively. From the viewpoint of the crystallinity of the phosphor, a=1 and b=2 are particularly preferred. If value a and value b depart from the above-mentioned respective ranges substantially, an inadequately crystalline phosphor or a different phase is likely to be formed, thus leading to deterioration of the luminance brightness, such being undesirable.

Further, the concentration of Eu (value x) is preferably within a range of from $5 \times 10^{-3} \leq x \leq 0.1$, particularly preferably within a range of from $5 \times 10^{-3} \leq x \leq 5 \times 10^{-2}$, also from the viewpoint of the luminance brightness. If value x exceeds 0.1, a different phase differing from the above composition tends to be formed, thus leading to deterioration of the luminance of the phosphor, and if it is lower than $5 \times 10^{-3}$, the amount of the luminescence center tends to be inadequate, thus leading to deterioration of the luminance brightness of the phosphor.

The phosphor paste composition of the present invention can be prepared by adding the above-described bivalent metal silicate phosphor of the present invention to a solvent having a binder resin dissolved therein, followed by kneading sufficiently, wherein the amount of the solvent is adjusted to obtain a paste having a suitable viscosity depending upon its particular purpose. As the binder resin to be used for preparing the phosphor paste composition containing the phosphor of the present invention, ethyl cellulose, nitro cellulose, polyethylene oxide or an acrylic resin may, for example, be used. Further, as a solvent to be used to adjust the viscosity of the paste, a solvent such as water, butyl acetate, butyl carbitol, butyl carbiacetate or terpineol, etc. may be used. Further, it is needless to say that as the phosphor in the phosphor paste composition of the present invention, a phosphor mixture of the bivalent metal silicate phosphor of the present invention with a phosphor having a different composition, may be used depending upon the particular purpose or application.

Further, the VUV excitation type light-emitting device of the present invention can be prepared in the same manner as for a conventional VUV excitation type light-emitting device, except that the phosphor paste composition of the present invention is coated at a desired portion depending upon the device inside of an envelope made of e.g. glass, followed by drying and then by baking treatment to form a phosphor layer, so that a phosphor layer made of the bivalent metal silicate phosphor of the present invention will be formed.

With the bivalent metal silicate phosphor of the present invention obtained as described above, the luminance brightness increases as compared with a conventional bivalent metal silicate phosphor containing no La in the composition. Accordingly, the luminance brightness of a VUV excitation type light-emitting device of the present invention having a phosphor layer formed of a phosphor paste composition of the present invention containing such a phosphor, will increase.

To prepare the phosphor of the second embodiment of the present invention, a mixture of phosphor materials comprising oxides of the respective metal elements i.e. Ca, Mg, Si, Eu, Zn, $M^{II}$ and $M^{III}$ to constitute a phosphor, or compounds of the above respective metals, such as carbonates, sulfates or halides, which can be converted to such oxides of the respective metals at high temperatures, in such proportions as to stoichiometrically form $(Ca_{1-x-u}Eu_xM^{II}{}_u)O \cdot a(Mg_{1-v}Zn_v)O \cdot bSiO_2 \cdot wM^{III}$ oxide (wherein $M^{II}$ is at least one metal element of Ba and Sr, $M^{III}$ is at least one metal element of Y, Ce, In and Bi, a, b, w, x, u and v are numbers satisfying the conditions of $0.9 \leq a \leq 1.1$, $1.9 \leq b \leq 2.2$, $5 \times 10^{-3} \leq x \leq 10^{-1}$ and $0 < u+v+w \leq 4 \times 10^{-1}$, respectively, the same applies hereinafter), is filled in a heat resistant container such as an alumina crucible, and thereafter treated in the same manner as in the above-described first embodiment.

In such a manner, an Eu-activated bivalent metal silicate phosphor of the present invention represented by the formula $(Ca_{1-x-u}Eu_xM^{II}{}_u)O \cdot a(Mg_{1-v}Zn_v)O \cdot bSiO_2 \cdot wM^{III}$ oxide, will be obtained. In the phosphor of the present invention, when metal element $M^{III}$ is Ce, Ce is believed to be present in the form of $CeO_2$ or $Ce_2O_3$ in the phosphor matrix, and when metal element $M^{III}$ is In, In is believed to be present in the form of $In_2O$ or $In_2O_3$. Likewise, if metal element $M^{III}$ is Bi, Bi is believed to be present in the form of BiO, $Bi_2O_3$, $Bi_2O_4$, $Bi_2O_5$, $Bi_2O_7$ in the phosphor matrix. Further, there may, for example, be a case where $M^{II}$ elements or Eu elements may not completely be substituted at lattice points occupied by Ca elements, or a case where Zn elements may not completely be substituted at lattice points occupied by Mg elements in the crystal. Inclusive of a phosphor having such a crystal composition, the phosphor having a composition represented by $(Ca_{1-x-u}Eu_xM^{II}{}_u)O \cdot a(Mg_{1-v}Zn_v)O \cdot bSiO_2 \cdot wM^{III}$ oxide in the present invention, is meant for a phosphor wherein the constituting ratio of the respective metal elements i.e. Ca, Mg, Si, $M^{II}$, $M^{III}$ and Eu contained in the phosphor produced by baking the mixture of phosphor materials, satisfies the constituting ratio (molar ratio) represented by the above formula.

With the Eu-activated bivalent metal silicate phosphor of the present invention, by the incorporation of metal element $M^{II}$, Zn and metal element $M^{III}$, the deterioration by VUV inherent to a conventional Eu-activated bivalent metal silicate phosphor, will be reduced. However, if the total content (u+v+w) of $M^{II}$, Zn and $M^{III}$ to suppress the deterioration by VUV exceeds $4 \times 10^{-1}$, the luminance brightness tends to be lower than the phosphor not containing $M^{II}$, Zn and $M^{III}$, such being undesirable. Accordingly, in order to suppress the deterioration by VUV and to obtain a phosphor having a is practical luminance, the total content (u+v+w) of the metal elements $M^{II}$, Zn and $M^{III}$ is preferably within a range of more than 0 and at most $4 \times 10^{-1}$. Further, among $M^{II}$, Zn and $M^{III}$, Zn and $M^{III}$ have higher activities to reduce the luminance brightness than $M^{II}$, and in consideration of the degree of the deterioration of the luminance brightness, the respective contents (u, v and w) of $M^{II}$, Zn and $M^{III}$ are more preferably within ranges of $0 \leq u \leq 2 \times 10^{-1}$, $0 \leq v \leq 10^{-1}$ and $0 \leq w \leq 10^{-1}$ (provided that $u+v+w \neq 0$).

Further, with the bivalent metal silicate phosphor of the present invention, as the above-mentioned values a and b representing the composition of the matrix crystal depart from 1.0 and 2.0, respectively, the probability for formation of an incompletely crystalline phosphor or a different phase tends to be high, and the luminance brightness tends to gradually decrease. Accordingly, from the viewpoint of the luminance brightness of the resulting phosphor, the above values a and b are preferably numbers within ranges of $0.9 \leq a \leq 1.1$ and $1.9 \leq b \leq 2.2$, and particularly preferably, the values a and b are a=1.0 and b=2.0, respectively. Further, if the above value x representing the amount of activator Eu exceeds 0.1, a different phase differing from the above composition tends to be formed, whereby the luminance of the phosphor tends to decrease, and if the value x is smaller than $5\times10^{-3}$, the amount of the luminescence center tends to be inadequate, whereby the emission intensity of the resulting phosphor tends to be low, such being undesirable. Accordingly, from the viewpoint of the luminance brightness of the resulting phosphor, the activation amount (value x) of Eu is preferably a number within a range of $5\times10^{-3} \leq x \leq 1\times10^{-1}$.

Further, the phosphor paste composition containing the phosphor of the present invention, and the VUV excitation type light-emitting device employing the phosphor of the present invention, can be produced by the same methods as for the above-mentioned first embodiment.

With the bivalent metal silicate phosphor of the present invention thus obtained, the deterioration by VUV is less than the conventional bivalent metal silicate phosphor containing neither metal element $M^{II}$, Zn nor metal element $M^{III}$ in its composition, and with the VUV excitation type light-emitting device of the present invention having a phosphor layer formed of the phosphor paste composition of the present invention containing such a phosphor, the decrease with time of the luminance during the operation of the device, is small.

To prepare the phosphor of the third embodiment of the present invention, a mixture of phosphor materials comprising oxides of Ca, Mg, Si, Eu, Zn and metal elements $M^{II}$ and $M^{III}$ to constitute a phosphor, or compounds of the above-mentioned respective metals, such as carbonates or sulfates, which can be converted to the oxides of the above-mentioned respective metals at high temperatures, in such proportions as to stoichiometrically form $(Ca_{1-x-u}Eu_xM^{II}_u)O \cdot a(Mg_{1-v}Zn_v)O \cdot bSiO_2 \cdot wM^{III}$ oxide (wherein $M^{II}$ is at least one metal element of Ba and Sr, $M^{III}$ is at least one metal element of La, Y, Ce, In and Bi, and a, b, w, x, u and v are numbers satisfying the conditions of $0.9 \leq a \leq 1.1$, $1.9 \leq b \leq 2.2$, $5\times10^{-3} \leq x \leq 10_{-1}$ and $0 \leq u+v+w \leq 4\times10^{-1}$, the same applies hereinafter), is filled in a heat resistant container such as an alumina crucible, and baked at least once in a reducing atmosphere at a temperature of at least 800° C., preferably from 1,000 to 1,400° C., over a period of from 2 to 40 hours. In this step of baking the phosphor material at least once at a temperature of at least 800° C., a chlorine compound or chlorine will be incorporated to the phosphor material.

Thereafter, this baked product may be subjected to post treatment such as dispersion, washing with water, drying or sieving, depending upon the necessity for e.g. the performance for forming of a phosphor layer of the phosphor to be finally employed.

It has been found that with an Eu-activated bivalent metal silicate phosphor prepared by the process of the present invention wherein a chlorine compound or chlorine is incorporated to the phosphor material in the step of baking the phosphor material at least once at a temperature of at least 800° C., the luminance brightness under excitation with VUV is higher than the conventional Eu-activated bivalent metal silicate phosphor, and further, the weight median particle diameter D50 is from 1 to 6 μm, i.e. the particle size is smaller than the conventional Eu-activated bivalent metal silicate phosphor.

In the preparation of the phosphor of the present invention, the chlorine supply source to be incorporated to the phosphor material may, for example, be an alkali metal chloride such as LiCl, NaCl, KCl, or an alkaline earth metal chloride such as $CaCl_2$ or $MgCl_2$, as a chlorine compound. However, the alkali metal chloride is likely to bring about formation of fused agglomerated particles with respect to the particles of the final phosphor after baking. On the other hand, the alkaline earth metal chloride contains a metal constituting the matrix of the phosphor and thus is influential over the matrix structure, and thus, it is not preferred, although such may depend upon the amount to be incorporated.

As one having no such drawbacks, ammonium chloride $NH_4Cl$ is preferred, whereby the influence of the alkali during baking is small. Further, when ammonium chloride is employed, it is possible to obtain a phosphor having a desired relatively small particle size and containing no substantial fused agglomerated particles, and it is possible to obtain one having a proper powder characteristic required to form a dense phosphor layer for a VUV excitation type light-emitting device such as a rare gas lamp or PDP, specifically a small particle size at a level of at most 10 μm, preferably from about 1 to 7 μm, more preferably from about 1 to 4 μm, as measured by Coulter Counter Method and a particle size distribution such that σ log(L) and σ log(S) are at most 0.5.

With respect to the amount of chlorine to be incorporated to the phosphor material, it is necessary to incorporate at least 0.001 wt % which is the minimum amount for the effect of the present invention to be applied to the crystal of the phosphor particles. A preferred specific content may vary depending also on the type of the chlorinated compound to be employed.

For the preparation of the phosphor of the present invention, in addition to the effect of the chlorine content as an object of the present invention, the following technical matters should also be taken into consideration, since the basic composition of the phosphor is substantially influential over the quality.

With the bivalent metal silicate phosphor of the present invention, as the above values a and b representing the composition of the matrix crystal depart from 1.0 and 2.0, respectively, the probability for formation of an incompletely crystalline phosphor or a different phase tends to be high, and the luminance brightness tends to gradually decrease. Accordingly, from the viewpoint of the luminance brightness of the resulting phosphor, the above values a and b are preferably numbers within ranges of $0.9 \leq a \leq 1.1$ and $1.9 \leq b \leq 2.2$, and particularly preferably, the values a and b are a=1.0 and b=2.0, respectively. Further, if the above value x representing the amount of activator Eu exceeds 0.1, a different phase differing from the above composition tends to be formed, whereby the luminance of the phosphor tends to decrease, and if the value x is smaller than $5\times10^{-3}$, the amount of the luminescence center tends to be inadequate, whereby the emission intensity of the resulting phosphor tends to be low, such being undesirable.

Accordingly, from the viewpoint of the luminance brightness of the resulting phosphor, the activation amount (value x) of Eu is preferably a number within a range of $5\times10^{-3} \leq x \leq 1\times10^{-1}$. Further, if the total content (u+v+w) of metal element $M^{II}$, Zn and metal element $M^{III}$, is larger than $4\times10^{-1}$, the luminance brightness tends to be lower than the phosphor not containing $M^{II}$, Zn and $M^{III}$, such being undesirable. Accordingly, the total amount of metal element $M^{II}$, Zn and metal element $M^{III}$ is preferably a number within a range of from $0 \leq (u+v+w) \leq 4\times10^{-1}$.

Further, the phosphor paste composition containing the phosphor of the present invention, and the VUV excitation type light-emitting device employing the phosphor of the present invention, can be produced by the same methods as for the above-mentioned first embodiment.

With the bivalent metal silicate phosphor of the present invention thus obtained, the particle size is small and improved as compared with a conventional bivalent metal silicate phosphor, whereby it has been made possible to use it as a compound for a VUV excitation type light-emitting device, for which formation of a phosphor layer used to be difficult with the conventional bivalent metal silicate phosphor, since the particle size used to be too large. Further, with the bivalent metal silicate phosphor of the present invention, the luminance brightness is higher than the conventional bivalent metal silicate phosphor, and further, also with respect to a VUV excitation type light-emitting device having a phosphor layer formed of a phosphor paste composition employing this phosphor, one having higher luminance than the conventional one, can be obtained.

To prepare the phosphor of the fourth embodiment of the present invention, a mixture of phosphor materials comprising oxides of Ca, Mg, Si, Eu, Zn and metal elements $M^{II}$ and $M^{III}$ to constitute a phosphor, or compounds of the above-mentioned respective metals, such as carbonates or sulfates, which can be converted to the oxides of the above-mentioned respective metals at high temperatures, in such proportions as to stoichiometrically form $(Ca_{1-x-u}Eu_xM^{II}_u)O \cdot a(Mg_{1-v}Zn_v)O \cdot bSiO_2 \cdot wM^{III}oxide \cdot tCl$ (wherein $M^{II}$ is at least one metal element of Ba and Sr, $M^{III}$ is at least one metal element of La, Y, Ce, In and Bi, and a, b, w, u, v and w are numbers satisfying the conditions of $0.9 \leq a \leq 1.1$, $1.9 \leq b \leq 2.2$, $5 \times 10^{-3} \leq x \leq 10^{-1}$, $0 \leq t \leq 2 \times 10^1$ and $0 \leq u+v+w \leq 4 \times 10^{-1}$, the same applies hereinafter), is filled in a heat resistant container such as an alumina crucible, and baked at least once in a reducing atmosphere at a temperature of at least 800° C., preferably from 1,000 to 1,400° C., over a period of from 2 to 40 hours. In this step of baking the phosphor material at least once at a temperature of at least 800° C., at least one member selected from the group consisting of bromine, iodine, a bromine compound and an iodine compound, will be incorporated to the phosphor material. Further, in this baking step, chlorine and a chlorine compound may also be incorporated.

Thereafter, this baked product may be subjected to post treatment such as dispersion, washing with water, drying or sieving, depending upon the necessity for e.g. the performance for forming of a phosphor layer of the phosphor to be finally employed.

It has been found that with the Eu-activated bivalent metal silicate phosphor containing at least one of bromine and iodine of the present invention, or with the Eu-activated bivalent metal silicate phosphor produced by the process of the present invention wherein at least one member selected from the group consisting of bromine, iodine, a bromine compound and an iodine compound is incorporated to the phosphor material in the step of baking the phosphor material at least once at a temperature of at least 800° C., the luminance brightness under excitation with VUV is higher than a conventional Eu-activated bivalent metal silicate phosphor, and further, the weight median particle diameter D50 is from 1 to 6 µm, and thus, the particle size is small.

In the preparation of the phosphor of the present invention, the source for supply of bromine or iodine to be incorporated to the phosphor material may, for example, be an alkali metal compound such as LiBr, LiI, NaBr, NaI, KBr or KI, or an alkaline earth metal compound such as $CaBr_2$, $CaI_2$, $MgBr_2$ or $MgI_2$. However, the alkali metal compound is likely to bring about formation of fused agglomerated particles with respect to the particles of the final phosphor after baking. On the other hand, the alkaline earth metal compound contains a metal constituting the matrix of the phosphor and thus is influential over the matrix structure, and thus, it is not preferred, although such may depend on the amount to be incorporated.

As one having no such drawbacks and being free from an influence of an alkali, ammonium bromide $NH_4Br$ or ammonium iodide $NH_4I$ is preferred. Further, when ammonium bromide or ammonium iodide is employed, it is possible to obtain a phosphor having a desired relatively small particle size and containing no substantial fused agglomerated particles, and it is possible to obtain one having a proper powder characteristic required to form a dense phosphor layer for a VUV excitation type light-emitting device such as a rare gas lamp or PDP, specifically a small particle size at a level of at most 10 µm, preferably from about 1 to 7 µm, more preferably from about 1 to 4 µm, as measured by Coulter Counter Method and a particle size distribution such that σ log(L) and σ log(S) are at most 0.5.

Further, with respect to the total amount of bromine and iodine to be incorporated to the phosphor material, it is necessary to incorporate at least 0.001 wt % which is the minimum amount for the effect of the present invention to be applied to the crystal of the phosphor particles. A preferred specific content may vary depending also on the type of the bromine compound and the iodine compound to be employed and the degree of air tightness of the crucible at the time of baking.

Further, for the preparation of the phosphor of the present invention, in addition to the effect of incorporating at least one member of bromine and iodine, as an object of the present invention, the following technical matters should also be taken into consideration, since the basic composition of the phosphor is substantially influential over the quality.

With the bivalent metal silicate phosphor of the present invention, as the above values a and b representing the composition of the matrix crystal depart from 1.0 and 2.0, respectively, the probability for formation of an incompletely crystalline phosphor or a different phase tends to be high, and the luminance brightness tends to gradually decrease. Accordingly, from the viewpoint of the luminance brightness of the resulting phosphor, the above values a and b are preferably numbers within ranges of $0.9 \leq a \leq 1.1$ and $1.9 \leq b \leq 2.2$, and particularly preferably, the values a and b are a=1.0 and b=2.0, respectively. Further, if the above value x representing the amount of activator Eu exceeds 0.1, a different phase differing from the above composition tends to be formed, whereby the luminance of the phosphor tends to decrease, and if the value x is smaller than $5 \times 10^{-3}$, the amount of the luminescence center tends to be inadequate, whereby the emission intensity of the resulting phosphor tends to be low, such being undesirable.

Accordingly, from the viewpoint of the luminance brightness of the resulting phosphor, the activation amount (value x) of Eu is preferably a number within a range of $5 \times 10^{-3} \leq x \leq 1 \times 10^{-1}$. If the content t of Cl element in the phosphor exceeds $2 \times 10^{-1}$, the luminance brightness tends to be lower than the phosphor containing no Cl element, such being undesirable. Accordingly, the content of Cl element is preferably a number within a range of $0 \leq t \leq 2 \times 10^{-1}$. Further, if the total content (u+v+w) of metal element $M^{II}$, Zn and metal element $M^{III}$, is larger than $4 \times 10^{-1}$, the luminance brightness tends to be lower than the phosphor not containing $M^{II}$, Zn and $M^{III}$, such being undesirable. Accordingly, the total amount of metal element $M^{II}$, Zn and metal element $M^{III}$ is preferably a number within a range of from $0 \leq (u+v+w) \leq 4 \times 10^{-1}$.

Further, the phosphor paste composition containing the phosphor of the present invention, and the VUV excitation type light-emitting device employing the phosphor of the present invention, can be produced by the same methods as for the above-mentioned first embodiment.

With the bivalent metal silicate phosphor of the present invention thus obtained, the particle size is small as compared with a conventional bivalent metal silicate phosphor, whereby it has been made possible to use it as a compound for a VUV excitation type light-emitting device, for which formation of a phosphor layer used to be difficult with the conventional bivalent metal silicate phosphor, since the particle size used to be too large. Further, with the bivalent metal silicate phosphor of the present invention, the luminance brightness is higher than the conventional bivalent metal silicate phosphor, and it is possible to obtain a VUV excitation type light-emitting device having a high luminance brightness, by forming a phosphor layer by a phosphor paste composition employing this phosphor.

Now, the present invention will be described in further detail with reference to Examples. However, it should be understood that the present invention is by no means restricted to such specific Examples.

EXAMPLE 1

| | | |
|---|---|---|
| $CaCO_3$ | 0.98 | mol |
| $MgCO_3$ | 1.0 | mol |
| $Eu_2O_3$ | 0.01 | mol |
| $SiO_2$ | 2.0 | mol |
| $La_2O_3$ | 0.0005 | mol |
| $NH_4F \cdot HF$ | 0.05 | mol |

The above compounds were thoroughly mixed to obtain a phosphor material, and this phosphor material was filled in an alumina crucible and baked in a reducing atmosphere at a maximum temperature of 1,150° C. over a period of 14 hours inclusive of the temperature raising and decreasing time. This baked product was subjected to treatments for dispersion, washing with water, drying and sieving, which are commonly carried out as post treatments for a phosphor, to obtain an Eu-activated silicate phosphor containing La element of Example 1, having a compositional formula of $(Ca_{0.98}Eu_{0.02})O \cdot MgO \cdot 2SiO_2 \cdot 0.0005La_2O_3$.

A powder of the phosphor of Example 1 thus obtained was filled in a cell having a cylindrical recess having a diameter of 12 mm and a depth of 1 mm, and was pressed by glass plate thereon to form a flat powdery phosphor screen, and this phosphor screen was irradiated and excited by VUV of 146 nm to emit light, whereby the luminance brightness and the luminescent color were measured, and the resultant stimulus (the luminance/y value) was obtained and found to be 104% of the resultant stimulus of the phosphor of the following Comparative Example 1 represented by the compositional formula $(Ca_{0.98}Eu_{0.02})O \cdot MgO \cdot 2SiO_2$, as measured in the same manner.

EXAMPLE 2

| | | |
|---|---|---|
| $CaCO_3$ | 0.98 | mol |
| $MgCO_3$ | 1.0 | mol |
| $Eu_2O_3$ | 0.01 | mol |
| $SiO_2$ | 2.0 | mol |
| $La_2O_3$ | 0.005 | mol |
| $NH_4F \cdot HF$ | 0.05 | mol |

An Eu-activated silicate phosphor of Example 2 containing La element, having a compositional formula of $(Ca_{0.98}Eu_{0.02})O \cdot MgO \cdot 2SiO_2 \cdot 0.005La_2O_3$, was obtained in the same manner as for the phosphor of Example 1 except that the above compounds were thoroughly mixed to obtain a phosphor material.

In the same manner as in Example 1, this phosphor of Example 2 was excited by VUV of 146 nm to emit light, whereby the luminance brightness and the chromaticity point of the luminescent color were measured, and the resultant stimulus (the luminance brightness/y value) was obtained and found to be 104% of the resultant stimulus of the phosphor of the following Comparative Example 1.

EXAMPLE 3

| | | |
|---|---|---|
| $CaCO_3$ | 0.98 | mol |
| $MgCO_3$ | 1.0 | mol |
| $Eu_2O_3$ | 0.01 | mol |
| $SiO_2$ | 2.0 | mol |
| $La_2O_3$ | 0.025 | mol |
| $NH_4F \cdot HF$ | 0.05 | mol |

An Eu-activated silicate phosphor of Example 3 containing La element, having a compositional formula of $(Ca_{0.98}Eu_{0.02})O \cdot MgO \cdot 2SiO_2 \cdot 0.025La_2O_3$, was obtained in the same manner as for the phosphor of Example 1 except that the above compounds were thoroughly mixed to obtain a phosphor material.

In the same manner as in Example 1, this phosphor of Example 3 was excited by VUV of 146 nm to emit light, whereby the luminance brightness and the chromaticity point of the luminescent color were measured, and the resultant stimulus (the luminance brightness/y value) was obtained and found to be 94% of the resultant stimulus of the phosphor of the following Comparative Example 1.

COMPARATIVE EXAMPLE 1

| | | |
|---|---|---|
| $CaCO_3$ | 0.98 | mol |
| $MgCO_3$ | 1.0 | mol |
| $Eu_2O_3$ | 0.01 | mol |
| $SiO_2$ | 2.0 | mol |
| $NH_4F \cdot HF$ | 0.05 | mol |

An Eu-activated silicate phosphor having a compositional formula $(Ca_{0.98}Eu_{0.02})O \cdot MgO \cdot 2SiO_2$, was obtained in the same manner as for the phosphor of Example 1 except that the above compounds were thoroughly mixed to obtain a phosphor material.

In the same manner as in Example 1, this phosphor of Comparative Example 1 was excited by VUV of 146 nm to emit light, whereby the luminance brightness and the chromaticity point of the luminescent color were measured, and the resultant stimulus (the luminance brightness/y value) was obtained from the measured values and used as the standard value for the luminance brightness of phosphors of the above respective Examples.

EXAMPLE 4

| | | |
|---|---|---|
| $CaCO_3$ | 0.97 | mol |
| $MgCO_3$ | 1.0 | mol |
| $Eu_2O_3$ | 0.01 | mol |
| $SiO_2$ | 2.0 | mol |
| $BaCO_3$ | 0.01 | mol |
| $NH_4F \cdot HF$ | 0.05 | mol |

The above phosphor materials were thoroughly mixed and treated in the same manner as in Example 1 to obtain an Eu-activated bivalent metal silicate phosphor of Example 4 having a compositional formula of $(Ca_{0.97}Eu_{0.02}Ba_{0.01})O \cdot MgO \cdot 2SiO_2$.

Then, 30 wt % of the obtained phosphor and 70 wt % of a mixture of a binder resin and a solvent, were kneaded to obtain a phosphor paste composition of Example 4. Instead of coating this paste composition on an inner wall of a glass tube, the paste composition was coated on a glass plate, dried and subjected to baking treatment to form a phosphor layer on the glass plate. This glass plate was inserted into a glass tube. After sealing both ends of the tube, the interior of the tube was once evacuated, then a gas mixture of Ne (95%)+Xe (5%) was sealed in, and electrodes were attached to both ends of the tube to obtain a rare gas lamp of Example 4.

Then, an electric power was supplied to the electrodes of the rare gas lamp of Example 4 to light the lamp continuously for 96 hours to let the phosphor layer in the lamp emit light, whereby the resultant stimulus-maintaining ratio ($M_{96}$) was 103.2%. Thus, the resultant stimulus-maintaining ratio was higher than the conventional Eu-activated bivalent metal silicate phosphor of the following Comparative Example containing no Ba, and yet, the luminance brightness was rather higher than the luminance immediately after lighting.

Here, the luminance of a blue-emitting phosphor changes substantially in proportion to its luminescent color (the value y in the CIE color system chromaticity coordinates). Accordingly, as a convenient method for comparing the luminous efficiency among blue-emitting phosphors having different y values of luminescent colors, it is common to compare them by means of the luminance/y value (hereinafter referred to as "the resultant stimulus") obtained by dividing the luminance by the value y when the luminescent color is represented by the chromaticity coordinates (x, y). Here, the rare gas lamp of Example 1 was continuously lighted, and the value ($I_{96}$) of the resultant stimulus as defined above upon expiration of 96 hours and the value ($I_0$) of the resultant stimulus immediately after lighting, were measured, respectively, and the relative percentage of the value of the resultant stimulus upon expiration of 96 hours to the value of the resultant stimulus immediately after lighting $[(I_{96})/(I_0)] \times 100$ (%)] was calculated, and this value was used as the above resultant stimulus-maintaining ratio ($M_{96}$).

EXAMPLES 5 TO 12

Eu-activated bivalent metal silicate phosphors of Examples 5 to 12 were prepared in the same manner as for the phosphors of Example 4 except that the compounds as identified in Table 1 were used as the phosphor materials in the blend ratio (mol ratio) as identified in Table 1.

Then, phosphor paste compositions of Examples 5 to 12 were prepared in the same manner as for the phosphor paste composition of Example 4 except that the phosphors of Examples 5 to 12 were used instead of the phosphor of Example 1 as the phosphor. Using these paste compositions, rare gas lamps of Examples 5 to 12 were prepared in the same manner as for the rare gas lamp of Example 4.

Then, the resultant stimulus-maintaining ratio ($M_{96}$) after lightning each of the rare gas lamps of Examples 5 to 12 for 96 hours, was measured in the same manner as in Example 4 and shown in Table 2 together with the composition of the phosphor used in the phosphor layer of its rare gas lamp. The resultant stimulus-maintaining ratio of each of the phosphors of Examples 5 to 12 was higher than that of the conventional Eu-activated bivalent metal silicate phosphor of the following Comparative Example, and yet, the luminance after lighting for 96 hours, was rather higher than the luminance immediately after lighting.

COMPARATIVE EXAMPLE 4

| | | |
|---|---|---|
| $CaCO_3$ | 0.98 | mol |
| $MgCO_3$ | 1.0 | mol |
| $SiO_2$ | 2.0 | mol |
| $Eu_2O_3$ | 0.01 | mol |
| $NH_4F \cdot HF$ | 0.05 | mol |

An Eu-activated silicate phosphor of Comparative Example 4 having a compositional formula of $(Ca_{0.98}Eu_{0.02})O \cdot MgO \cdot 2SiO_2$, was obtained in the same manner as in Example 4 except that the above compounds were used as phosphor materials.

A phosphor paste composition of Comparative Example 4 was prepared in the same manner as for the phosphor paste composition of Example 4 except that the phosphor of Comparative Example 4 was used instead of the phosphor of Example 4 as the phosphor. Using this paste composition, a rare gas lamp of Comparative Example 4 was prepared in the same manner as for the rare gas lamp of Example 4.

Then, the resultant stimulus-maintaining ratio ($M_{96}$) after lighting the rare gas lamp of Comparative Example 4 for 96 hours, was measured in the same manner as in Example 4 and found to be 99.8%.

TABLE 1

| | Compounds as phosphor materials (mol) | | | | | | |
|---|---|---|---|---|---|---|---|
| Examples (Comparative Example) | $CaCO_3$ | $MgCO_3$ | $SiO_2$ | $Eu_2O_3$ | $NH_4F \cdot HF$ | Material to supply $M^I$ or $M^{II}$ | (mol) |
| Ex. 4 | 0.97 | 1.0 | 2.0 | 0.01 | 0.05 | $BaCO_3$ | 0.01 |
| Ex. 5 | 0.97 | 1.0 | 2.0 | 0.01 | 0.05 | $SrCO_3$ | 0.01 |
| Ex. 6 | 0.93 | 1.0 | 2.0 | 0.01 | 0.05 | $SrCO_3$ | 0.05 |
| Ex. 7 | 0.88 | 1.0 | 2.0 | 0.01 | 0.05 | $SrCO_3$ | 0.1 |
| Ex. 8 | 0.98 | 0.99 | 2.0 | 0.01 | 0.05 | ZnO | 0.01 |
| Ex. 9 | 0.98 | 1.0 | 2.0 | 0.01 | 0.05 | $Y_2O_3$ | 0.005 |
| Ex. 10 | 0.98 | 1.0 | 2.0 | 0.01 | 0.05 | $In_2O_3$ | 0.005 |
| Ex. 11 | 0.98 | 1.0 | 2.0 | 0.01 | 0.05 | $CeO_3$ | 0.01 |
| Ex. 12 | 0.98 | 1.0 | 2.0 | 0.01 | 0.05 | $Bi_2O_3$ | 0.005 |
| Comp. Ex. 4 | 0.98 | 1.0 | 2.0 | 0.01 | 0.05 | — | |

TABLE 2

| Examples (Comparative Example) | Compositional formula of phosphor | Resultant stimulus-maintaining ratio ($M_{96}$) |
|---|---|---|
| Ex. 4 | $(Ca_{0.97}Ba_{0.01}Eu_{0.02})O \cdot MgO \cdot 2SiO_2$ | 103.2 |
| Ex. 5 | $(Ca_{0.97}Sr_{0.01}Eu_{0.02})O \cdot MgO \cdot 2SiO_2$ | 102.2 |
| Ex. 6 | $(Ca_{0.93}Sr_{0.05}Eu_{0.02})O \cdot MgO \cdot 2SiO_2$ | 104.7 |
| Ex. 7 | $(Ca_{0.88}Sr_{0.1}Eu_{0.02})O \cdot MgO \cdot 2SiO_2$ | 105.2 |
| Ex. 8 | $(Ca_{0.98}Eu_{0.02})O(Mg_{0.99}Zn_{0.01})O \cdot 2SiO_2$ | 103.9 |
| Ex. 9 | $(Ca_{0.98}Eu_{0.02})O \cdot MgO \cdot 2SiO_2 \cdot 0.01Y$ | 103.1 |
| Ex. 10 | $(Ca_{0.98}Eu_{0.02})O \cdot MgO \cdot 2SiO_2 \cdot 0.01In$ | 101.3 |
| Ex. 11 | $(Ca_{0.98}Eu_{0.02})O \cdot MgO \cdot 2SiO_2 \cdot 0.01Ce$ | 107.0 |
| Ex. 12 | $(Ca_{0.98}Eu_{0.02})O \cdot MgO \cdot 2SiO_2 \cdot 0.01Bi$ | 106.0 |
| Comp. Ex. 4 | $(Ca_{0.98}Eu_{0.02})O \cdot MgO \cdot SiO_2$ | 99.8 |

EXAMPLE 13A

| | | |
|---|---|---|
| $CaCO_3$ | 0.98 | mol |
| $MgCO_3$ | 1.0 | mol |
| $SiO_2$ | 2.0 | mol |
| $Eu_2O_3$ | 0.01 | mol |
| $NH_4Cl$ | 0.2 | mol |

Phosphor materials in the above proportions containing 2.2 wt % of chlorine, were thoroughly mixed. Then, 300 g of the mixture was filled in an alumina crucible and baked in a reducing atmosphere at a maximum temperature of 1,150° C. over a period of 14 hours inclusive of the temperature raising and decreasing time. The baked product was subjected to sieving to obtain an Eu-activated bivalent metal silicate phosphor of Example 13A having a compositional formula of $(Ca_{0.98}Eu_{0.02})O \cdot MgO \cdot 2SiO_2$, containing 13,000 µm of chlorine and showing positive electrification with a relative blow off electrostatic charge of 1.8 µC/g to a poval resin.

Here, the chlorine content in the phosphor of the present invention was determined as follows. Firstly, a solution having the phosphor of the present invention dissolved by boric acid and sodium carbonate, was added to a mixed solution comprising 1% of silver nitrate, 50% of glycerol and 49% of pure water, to precipitate silver chloride, and the turbidity of the solution by the silver chloride, was measured by a spectrophotometer. The amount of chlorine was quantitatively analyzed by comparing the turbidity of this solution with the turbidity of a standard solution prepared by adding a predetermined amount of chlorine directly to a mixed solution comprising 1% of silver nitrate, 50% of glycerol and 49% of pure water.

A powder of the phosphor of Example 13A thus obtained, was filled in a cell having a cylindrical recess having a diameter of 12 mm and a depth of 1 mm, and by a glass plate was pressed thereon to prepare a flat powdery phosphor screen, and this phosphor screen was irradiated and excited by VUV of 146 nm to emit light, whereby the luminance brightness and the chromaticity point of the luminescent color were measured, and the resultant stimulus (the luminance brightness/y value) was calculated and found to be 116% relative to 100% of the resultant stimulus of the following Comparative Example 13A as measured in the same manner.

Further, the particle size distribution of this phosphor of Example 13A was determined by Coulter Counter Method, whereby the weight median particle diameter (D50) was 3.9 µm, σ log(L)=0.38, and σ log(S)=0.45.

Here, Dn represents a particle size at weight base cumulative n% from the small particle size side, and σ log(L) and σ log(S) are values represented by σ log(L)=log(D84.1/D50) and σ log(s)=−log(D15.9/D50), respectively. σ log(L) represents the particle size distribution on the large particle size side of D50, and σ log(S) represents the particle size distribution on the small particle size side of D50, and the larger the numerical values thereof, the broader the particle size distributions.

EXAMPLE 13B 30 wt % of the Eu-activated bivalent metal silicate phosphor of Example 13A, 10 wt % of butyl carbitol, 53 wt % of butyl carbitol acetate and 7 wt % of ethyl cellulose were thoroughly kneaded to obtain a phosphor paste composition of Example 13B.

EXAMPLE 13C

The phosphor paste composition of Example 13B obtained as described above, was coated on a glass plate having a width of 2 mm, dried at 120° C. for 30 minutes and then baked at 500° C. for 30 minutes, to form a phosphor layer on the glass plate. This glass plate was placed in a glass tube having an outer diameter of 4 mm. Nickel electrodes were attached to both ends of this glass tube, and after evacuating the interior of the tube, 50 torr of a gas comprising 98% of Ne and 2% of xe was sealed in, to obtain a VUV excitation type light-emitting device (rare gas lamp) of Example 13C. It was confirmed by visual observation that the phosphor layer formed of the phosphor paste composition of Example 13B was dense and free from irregularity, as was different from a phosphor layer formed of a conventional phosphor $CaMgSi_2O_6$ containing no chlorine, which was rough as the particle size was too large. Further, the VUV excitation type light-emitting device of Example 13C was found to be one which can be practically used without any problem.

EXAMPLE 14A

| | | |
|---|---|---|
| $CaCO_3$ | 0.98 | mol |
| $MgCO_3$ | 1.0 | mol |
| $SiO_2$ | 2.0 | mol |
| $Eu_2O_3$ | 0.01 | mol |
| $NH_4Cl$ | 0.2 | mol |

An Eu-activated bivalent metal silicate phosphor of Example 14A having a compositional formula of $(Ca_{0.98}Eu_{0.02})O \cdot MgO \cdot 2SiO_2$, containing 200 ppm of chlorine and showing positive electrification with a relative blow off electrostatic charge of 14.1 µC/g to a poval resin, was obtained in the same manner as in Example 13A except that phosphor materials in the above proportions containing 2.2 wt % of chlorine were thoroughly mixed, and then 16 g of the mixture was filled in the alumina crucible.

In the same manner as in Example 13A, this phosphor of Example 14A was excited by VUV of 146 nm to emit light, whereby the luminance brightness and the chromaticity point of the luminescent color were measured, and the resultant stimulus was obtained and found to be 132% relative to 100% of the resultant stimulus of the following Comparative Example 13A.

Further, the particle size distribution of this phosphor of Example 14A was determined by Coulter Counter Method, whereby the weight median particle diameter (D50) was 6.0 µm, σ log(L)=0.43, and σ log(S)=0.43.

EXAMPLE 14B

A paste composition of Example 14B was prepared in the same manner as for the phosphor paste composition of Example 13B except that instead of the phosphor of Example 13A, the phosphor of Example 14A was used.

EXAMPLE 14C

A VUV excitation type light-emitting device of Example 14C was obtained in the same manner as in Example 13C except that instead of the phosphor paste composition of Example 13B, the phosphor paste composition of Example 14B was used. It was confirmed by visual observation that the phosphor layer formed of the phosphor paste composition of Example 14B, was dense and free from irregularities. The VUV excitation type light-emitting device of Example 14C was found to be one which can be practically used without any problem.

COMPARATIVE EXAMPLE 13A

| CaCO₃ | 0.98 | mol |
|---|---|---|
| MgCO₃ | 1.0 | mol |
| SiO₂ | 2.0 | mol |
| EuF₃ | 0.02 | mol |

An Eu-activated bivalent metal silicate phosphor of Comparative Example 13A having a compositional formula of $(Ca_{0.98}Eu_{0.02})O \cdot MgO \cdot 2SiO_2$, containing no chlorine and showing negative electrification with a relative blow off electrostatic charge of $-13.6$ $\mu C/g$ to a poval resin, was obtained in the same manner as in Example 13A except that phosphor materials in the above proportions containing no chlorine were thoroughly mixed, and then 16 g of the mixture was filled in the alumina crucible.

In the same manner as in Example 13A, this phosphor of Comparative Example 13A was excited by VUV of 146 nm, whereby the luminance brightness and the chromaticity point of the luminescent color were measured, and the resultant stimulus was obtained, and the obtained value was rated to be 100% and used as the standard for the resultant stimulus.

Further, the particle size distribution of this phosphor of Comparative Example 13A was determined by Coulter Counter Method, whereby the weight median particle diameter (D50) was 8.5 $\mu m$, $\sigma$ log(L)=0.59, and $\sigma$ log(S)=0.66, and thus the properties did not reach the desired levels.

COMPARATIVE EXAMPLE 13B

A paste composition of Comparative Example 13B was prepared in the same manner as for the phosphor paste composition of Example 13B except that instead of the phosphor of Example 13A, the phosphor of Comparative Example 13A was used.

COMPARATIVE EXAMPLE 13C

A VUV excitation type light-emitting device of Comparative Example 13C was obtained in the same manner as for the VUV excitation type light-emitting device of Example 13C except that instead of the phosphor paste composition of Example 13B, the phosphor paste composition of Comparative Example 13B was used. The phosphor layer formed of the phosphor paste composition of Comparative Example 13B had many pinholes, irregularities and peeled portions, and the VUV excitation type light-emitting device of Comparative Example 13C was not qualified as a practical one.

COMPARATIVE EXAMPLE 14A

| CaCO₃ | 0.98 | mol |
|---|---|---|
| MgCO₃ | 1.0 | mol |
| SiO₂ | 2.0 | mol |
| Eu₂O₃ | 0.01 | mol |

An Eu-activated bivalent metal silicate phosphor of Comparative Example 14 having a compositional formula of $(Ca_{0.98}Eu_{0.02})O \cdot MgO \cdot 2SiO_2$, containing no chlorine and showing negative electrification with a relative blow off electrostatic charge of $-9.6$ $\mu C/g$ to a poval resin, was obtained in the same manner as in Example 13A except that phosphor materials in the above proportions containing no chlorine were thoroughly mixed, and then 16 g of the mixture was filled in the alumina crucible.

In the same manner as in Example 13A, this phosphor of Comparative Example 14A was excited by VUV of 146 nm, whereby the luminance brightness and the chromaticity point of the luminescent color were measured, and the resultant stimulus was obtained and found to be 9% relative to 100% of the resultant stimulus of the above Comparative Example 13A.

Further, the particle size distribution of this phosphor of Comparative Example 14A was determined by Coulter Counter Method, whereby the weight median particle diameter (D50) was 41.4 $\mu m$, $\sigma$ log(L)=0.53, and $\sigma$ log(S)=1.09, and thus the particle size was very large, and the particle distribution was very broad.

The phosphor of Comparative Example 14A was not used as a phosphor, since the emission intensity was very weak.

EXAMPLE 15A

| CaCO₃ | 0.98 | mol |
|---|---|---|
| MgCO₃ | 1.0 | mol |
| SiO₂ | 2.0 | mol |
| Eu₂O₃ | 0.01 | mol |
| NH₄Cl | 0.2 | mol |

Phosphor materials in the above proportions containing 2.2 wt % of chlorine were thoroughly mixed, and then, 300 g of the mixture was filled in an alumina crucible and baked in a reduced atmosphere at a maximum temperature of 1,150° C. over a period of 14 hours inclusive of the temperature raising and decreasing time. This baked product was subjected to rough sieving. Then, 200 g of this baked product was put together with 400 g of pure water and 400 g of 5 ø alumina balls in a glass pot having a capacity of 1,000 ml and mixed to carry out wet system ball milling at a rotational speed of 19.1 Hz for 16 hours. After this dispersion treatment, drying and sieving treatments were applied to obtain an Eu-activated bivalent metal silicate phosphor of Example 15A having a compositional formula of $(Ca_{0.98}Eu_{0.02})O \cdot MgO \cdot 2SiO_2$, containing 760 ppm of chlorine and showing positive electrification with a relative blow off electrostatic charge of 30.9 $\mu C/g$ to a poval resin.

In the same manner as in Example 13A, this phosphor of Example 15A was excited by VUV of 146 nm to emit light, whereby the luminance brightness and the chromaticity point of the luminescent color were measured, and the resultant stimulus was obtained and found to be 104% relative to 100% of the resultant stimulus of the above Comparative Example 13A.

Further, the particle size distribution of this phosphor of Example 15A was determined by Coulter Counter Method, whereby the weight median particle diameter (D50) was 2.9 µm, σlog(L)=0.27, and σlog(S)=0.30.

EXAMPLE 15B

A paste composition of Example 15B was prepared in the same manner as for the phosphor paste composition of Example 13B except that instead of the phosphor of Example 13A, the phosphor of Example 15A was used.

EXAMPLE 15C

A VUV excitation type light-emitting device of Example 15C was obtained in the same manner as in Example 13C except that instead of the phosphor paste composition of Example 13B, the phosphor paste composition of Example 15B was used. It was confirmed by visual observation that the phosphor layer formed of the phosphor paste composition of Example 15B, was dense and free from irregularities. The VUV excitation type light-emitting device of Example 15C was found to be one which can be practically used without any problem.

COMPARATIVE EXAMPLE 15A

| | | |
|---|---|---|
| $CaCO_3$ | 0.98 | mol |
| $MgCO_3$ | 1.0 | mol |
| $SiO_2$ | 2.0 | mol |
| $Eu_2O_3$ | 0.01 | mol |
| $NH_4HF_2$ | 0.05 | mol |

An Eu-activated bivalent metal silicate phosphor of Comparative Example 15A having a compositional formula of $(Ca_{0.98}Eu_{0.02})O\cdot MgO\cdot 2SiO_2$, containing no chlorine and showing negative electrification with a relative blow off electrostatic charge of −10.4 µC/g to a poval resin, was obtained in the same manner as in Example 15A except that phosphor materials in the above proportions containing no chlorine were thoroughly mixed.

In the same manner as in Example 13A, this phosphor of Comparative Example 15A was excited by VUV of 146 rim to emit light, whereby the luminance brightness and the chromaticity point of the luminescent color were measured, and the resultant stimulus was obtained and found to be 98% relative to 100% of the resultant stimulus of the above Comparative Example 13A.

Further, the particle size distribution of this phosphor of Comparative Example 15A was determined by Coulter Counter Method, whereby the weight median particle diameter (D50) was 7.7 µm, σ log(L)=0.37, and σ log(S)—0.56.

COMPARATIVE EXAMPLE 15B

A paste composition of Comparative Example 15B was prepared in the same manner as for the phosphor paste composition of Example 13B except that instead of the phosphor of Example 13A, the phosphor of Comparative Example 15A was used.

COMPARATIVE EXAMPLE 15C

A VUV excitation type light-emitting device of Comparative Example 15C was obtained in the same manner as for the VUV excitation type light-emitting device of Example 13C except that instead of the phosphor paste composition of Example 13B, the phosphor paste composition of Comparative Example 15B was used. The phosphor layer formed of the phosphor paste composition of Example 15B had many pinholes, irregularities and peeled portions, and the VUV excitation type light-emitting device of Comparative Example 15C was not qualified as a practical one.

COMPARATIVE EXAMPLE 16A

| | | |
|---|---|---|
| $CaCO_3$ | 0.98 | mol |
| $MgCO_3$ | 1.0 | mol |
| $SiO_2$ | 2.0 | mol |
| $Eu_2O_3$ | 0.01 | mol |
| $NH_4Br$ | 0.2 | mol |

Phosphor materials in the above proportions containing 4.8 wt % of bromine were thoroughly mixed, and then, 15 g of the mixture was filled in an alumina crucible and baked in a reducing atmosphere at a maximum temperature of 1,150° C. over a period of 14 hours inclusive of the temperature raising and decreasing time. This baked product was subjected to sieving to obtain an Eu-activated bivalent metal silicate phosphor of Example 16A having a compositional formula of $(Ca_{0.98}Eu_{0.02})O\cdot MgO\cdot 2SiO_2$, containing 200 ppm of bromine and showing positive electrification with a relative blow off electrostatic charge of 18.2 µC/g to a poval resin.

The content of bromine or iodine in the phosphor of the present invention was determined by comparing the Kα ray of bromine or iodine by fluorescent X-ray apparatus ZSX manufactured by Rigaku Denki K.K., with a calibration curve derived by a standard addition method.

A powder of the phosphor of Example 16A thus obtained, was irradiated and excited by VUV of 146 nm in in the same manner as in Example 13A to emit light, whereby the luminance brightness and the chromaticity point of the luminescent color were measured, and the resultant stimulus (the luminance brightness/y value) was determined, whereby that of Example 16A was 120% relative to 100% of the resultant stimulus of the following Comparative Example 16A as measured in the same manner.

Further, the particle size distribution of this phosphor of Example 16A was determined by Coulter Counter Method, whereby the weight median particle diameter (D50) was 3.7 µm, σ log(L)=0.37, and σ log(S)=0.42.

EXAMPLE 16B 30 wt % of the Eu-activated bivalent metal silicate phosphor of Example 16A, 10 wt % of butyl carbitol, 53 wt % of butyl carbitol acetate and 7 wt % of ethyl cellulose were thoroughly kneaded to obtain a phosphor paste composition of Example 16B.

EXAMPLE 16C

Using the phosphor paste composition of Example 16B obtained as described above, a VUV excitation type light-emitting device (rare gas lamp) of Example 16C was prepared in the same manner as in Example 13C. While it was considered that with a conventional phosphor $CaMgSi_2O_6$ containing no bromine or iodine, the particle size was too large to form a dense phosphor layer, it was confirmed by visual observation that the phosphor layer formed of the phosphor paste composition of Example 16B, was-dense and free from irregularities, and the VUV excitation type light-emitting device of Example 16C was one which can be practically used without any problem.

EXAMPLE 17A

| | | |
|---|---|---|
| CaCO$_3$ | 0.98 | mol |
| MgCO$_3$ | 1.0 | mol |
| SiO$_2$ | 2.0 | mol |
| Eu$_2$O$_3$ | 0.01 | mol |
| NH$_4$Br | 0.5 | mol |

An Eu-activated bivalent metal silicate phosphor of Example 17A having a compositional formula of (Ca$_{0.98}$Eu$_{0.02}$)O·MgO·2SiO$_2$, containing 240 ppm of bromine and showing positive electrification with a relative blow off electrostatic charge of 30.3 µC/g to a poval resin, was obtained in the same manner as in Example 16A except that phosphor materials in the above proportions containing 11 wt % of bromine, were thoroughly mixed, and then, 15 g of the mixture was filled in the alumina crucible.

In the same manner as in Example 16A, this phosphor of Example 17A was excited by VUV of 146 run to emit light, whereby the luminance brightness and the chromaticity point of the luminescent color were measured, and the resultant stimulus was obtained and found to be 114% relative to 100% of the resultant stimulus of the following Comparative Example 17A.

Further, the particle size distribution of this phosphor of Example 17A was determined by Coulter Counter Method, whereby the weight median particle diameter (D50) was 3.6 µm, σ log(L)=0.34, and σ log(S)=0.39.

EXAMPLE 17B

A paste composition of Example 17B was prepared in the same manner as for the phosphor paste composition of Example 16B except that instead of the phosphor of Example 16A, the phosphor of Example 17A was used.

EXAMPLE 17C

A VUV excitation type light-emitting device of Example 17C was obtained in the same manner as in Example 16C except that instead of the phosphor paste composition of Example 16B, the phosphor paste composition of Example 17B was used. It was confirmed by visual observation that the phosphor layer formed of the phosphor paste composition of Example 17B, was dense and free from irregularities. The VUV excitation type light-emitting device of Example 17C was one which can be practically used without any problem.

EXAMPLE 18A

| | | |
|---|---|---|
| CaCO$_3$ | 0.98 | mol |
| MgCO$_3$ | 1.0 | mol |
| SiO$_2$ | 2.0 | mol |
| Eu$_2$O$_3$ | 0.01 | mol |
| NH$_4$I | 0.2 | mol |

An Eu-activated bivalent metal silicate phosphor of Example 18A having a compositional formula of (Ca$_{0.98}$Eu$_{0.02}$)O·MgO·2SiO$_2$, containing 230 ppm of iodine and showing positive electrification with a relative blow off electrostatic charge of 30.3 µC/g to a poval resin, was obtained in the same manner as in Example 16A except that phosphor materials in the above proportions containing 7.4 wt % of iodine, were thoroughly mixed, and then, 15 g of the mixture was filled in the alumina crucible.

In the same manner as in Example 16A, this phosphor of Example 18A was excited by VUV of 146 nm to emit light, whereby the luminance brightness and the chromaticity point of the luminescent color were measured, and the resultant stimulus was obtained and found to be 104% relative to 100% of the resultant stimulus of the following Comparative Example 16A.

Further, the particle size distribution of this phosphor of Example 18A was determined by Coulter Counter Method, whereby the weight median particle diameter (D50) was 5.5 µm, σlog(L)=0.45, and σlog(S)=0.47.

EXAMPLE 18B

A paste composition of Example 18B was prepared in the same manner as for the phosphor paste composition of Example 16B except that instead of the phosphor of Example 16A, the phosphor of Example 18A was used.

EXAMPLE 18C

A VUV excitation type light-emitting device of Example 18C was obtained in the same manner as in Example 16C except that instead of the phosphor paste composition of Example 16B, the phosphor paste composition of Example 18B was used. It was confirmed by visual observation that the phosphor layer formed of the phosphor paste composition of Example 18B, was dense and free from irregularities. The VUV excitation type light-emitting device of Example 18C was one which can be practically used without any problem.

EXAMPLE 19A

| | | |
|---|---|---|
| CaCO$_3$ | 0.98 | mol |
| MgCO$_3$ | 1.0 | mol |
| SiO$_2$ | 2.0 | mol |
| Eu$_2$O$_3$ | 0.01 | mol |
| NH$_4$I | 0.5 | mol |

An Eu-activated bivalent metal silicate phosphor of Example 19A having a compositional formula of (Ca$_{0.98}$Eu$_{0.02}$)O·MgO·2SiO$_2$, containing 450 ppm of iodine and showing positive electrification with a relative blow off electrostatic charge of 30.3 µC/g to a poval resin, was obtained in the same manner as in Example 16A except that phosphor materials in the above proportions containing 16 wt % of iodine, were thoroughly mixed, and then, 15 g of the mixture was filled in the alumina crucible.

In the same manner as in Example 16A, this phosphor of Example 19A was excited by VUV of 146 nm to emit light, whereby the luminance brightness and the chromaticity point of the luminescent color were measured, and the resultant stimulus was obtained and found to be 114% relative to 100% of the resultant stimulus of the following Comparative Example 16A.

Further, the particle size distribution of this phosphor of Example 19A was determined by Coulter Counter Method, whereby the weight median particle diameter (D50) was 5.8 µm, σ log(L)=0.48, and σ log(S)=0.48.

EXAMPLE 19B

A paste composition of Example 19B was prepared in the same manner as for the phosphor paste composition of Example 16B except that instead of the phosphor of Example 16A, the phosphor of Example 19A was used.

EXAMPLE 19C

A VUV excitation type light-emitting device of Example 19C was obtained in the same manner as in Example 16C except that instead of the phosphor paste composition of Example 16B, the phosphor paste composition of Example 19B was used. It was confirmed by visual observation that the phosphor layer formed of the phosphor paste composition of Example 19B, was dense and free from irregularities. The VUV excitation type light-emitting device of Example 19C was one which can be practically used without any problem.

COMPARATIVE EXAMPLE 16A

| | | |
|---|---|---|
| CaCO$_3$ | 0.98 | mol |
| MgCO$_3$ | 1.0 | mol |
| SiO$_2$ | 2.0 | mol |
| EuF$_3$ | 0.02 | mol |

An Eu-activated bivalent metal silicate phosphor of Comparative Example 16A having a compositional formula of $(Ca_{0.98}Eu_{0.02})O \cdot MgO \cdot 2SiO_2$, containing no bromine or iodine and showing negative electrification with a relative blow off electrostatic charge of $-13.6$ $\mu$C/g to a poval resin, was obtained in the same manner as in Example 16A except that phosphor materials in the above proportions containing no bromine or iodine, were thoroughly mixed, and then, 15 g of the mixture was filled in the alumina crucible.

In the same manner as in Example 16A, this phosphor of Comparative Example 16A was excited by VUV of 146 nm to emit light, whereby the luminance brightness and the chromaticity point of the luminescent color were measured, and the resultant stimulus was obtained, and the obtained value was rated to be 100% and used as the standard for the resultant stimulus.

Further, the particle size distribution of this phosphor of Comparative Example 16A was determined by Coulter Counter Method, whereby the weight median particle diameter (D50) was 12.4 $\mu$m, $\sigma$ log(L)=0.87, and $\sigma$ log(S)=0.70.

COMPARATIVE EXAMPLE 16B

A paste composition of Comparative Example 16B was prepared in the same manner as for the phosphor paste composition of Example 16B except that instead of the phosphor of Example 16A, the phosphor of Comparative Example 16A was used.

COMPARATIVE EXAMPLE 16C

A VUV excitation type light-emitting device of Comparative Example 16C was obtained in the same manner as for the VUV excitation type light-emitting device of Example 16 except that instead of the phosphor paste composition of Example 16B, the phosphor paste composition of Comparative Example 16B was used. The phosphor layer formed of the phosphor paste composition of Comparative Example 16B had many pinholes, irregularities and peeled portions. Accordingly, the VUV excitation type light-emitting device of Comparative Example 16C was not qualified as a practical one.

COMPARATIVE EXAMPLE 17A

| | | |
|---|---|---|
| CaCO$_3$ | 0.98 | mol |
| MgCO$_3$ | 1.0 | mol |
| SiO$_2$ | 2.0 | mol |
| Eu$_2$O$_3$ | 0.01 | mol |

An Eu-activated bivalent metal silicate phosphor of Comparative Example 17A having a compositional formula of $(Ca_{0.98}Eu_{0.02})O \cdot MgO \cdot 2SiO_2$, containing no bromine or iodine and showing negative electrification with a relative blow off electrostatic charge of $-9.6$ $\mu$C/g to a poval resin, was obtained in the same manner as in Example 16A except that phosphor materials in the above proportions containing no bromine or iodine, were thoroughly mixed, and then, 15 g of the mixture was filled in the alumina crucible.

In the same manner as in Example 16A, this phosphor of Comparative Example 17A was excited by VUV of 146 nm to emit light, whereby the luminance brightness and the chromaticity point of the luminescent color were measured, and the resultant stimulus was obtained and found to be 9% relative to 100% of the resultant stimulus of the above Comparative Example 16A.

Further, the particle size distribution of this phosphor of Comparative Example 17A was determined by Coulter Counter Method, whereby the weight median particle diameter (D50) was 41.4 $\mu$m, $\sigma$ log(L)=0.53, and $\sigma$ log(s)=1.09.

The phosphor of Comparative Example 17A had a very weak emission intensity and thus was not practically useful as a phosphor.

According to the present invention, by adopting the above-described construction, the luminance brightness can be improved over the conventional Eu-activated bivalent metal silicate phosphor, the deterioration by VUV can be reduced, and further, and the powder characteristic suitable for forming a phosphor layer can be obtained. Accordingly, by using this phosphor for a phosphor layer, it has been made possible to provide a VUV excitation type light-emitting device having high luminance.

The entire disclosures of Japanese Patent Application No. 2002-124997 filed on Mar. 22, 2002, Japanese Patent Application No. 2002-186899 filed on May 23, 2002, Japanese Patent Application No. 2002-332900 filed on Oct. 10, 2002 and Japanese Patent Application no. 2003-060646 filed on Jan. 30, 2003 including specifications, claims, drawings and summaries are incorporated herein by reference in their entireties.

What is claimed is:

1. A bivalent metal silicate phosphor which comprises, as matrix crystal, a silicate containing, as constituting metal elements, calcium (Ca), magnesium (Mg) and silicon (Si) and which is activated by Europium (Eu), wherein lanthanum (La) is contained in the composition of the phosphor, which is represented by the formula $(Ca_{1-x}Eu_x)O \cdot aMgO \cdot bSiO_2 \cdot cLa_2O_3$, wherein a, b, c and x are numbers satisfying the conditions of $0.9 \leq a \leq 1.1$, $1.9 \leq b \leq 2.2$, $0 < c \leq 2.5 \times 10^{-2}$ and $5 \times 10^{-3} \leq x \leq 0.1$, respectively.

2. The bivalent metal silicate phosphor according to claim 1, wherein said a, b and c are numbers satisfying the conditions of a=1, b=2 and $2.5 \times 10^{-4} \leq c \leq 1.5 \times 10^{-2}$, respectively.

3. A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in claim 1.

4. A bivalent metal silicate phosphor which comprises, as matrix crystal, a silicate containing, as constituting metal elements, calcium (Ca), magnesium (Mg) and silicon (Si) and which is activated by Europium (Eu), wherein at least one member selected from the group consisting of barium (Ba), strontium (Sr), zinc (Zn), yttrium (Y), cerium (Ce), indium (In) and bismuth (Bi) is contained in the composition of the phosphor, which is represented by the formula $(Ca_{1-x-u}Eu_xM^{II}_u)O \cdot a(Mg_{1-v}Zn_v)O \cdot bSiO_2 \cdot wM^{III}$ oxide, wherein $M^{II}$ is at least one metal element selected from the group consisting of barium (Ba) and strontium (Sr), $M^{III}$ is at least one metal element selected from the group consisting of yttrium (Y), cerium (Ce), Indium (In) and bismuth (Bi), and a, b, x, u, v and w are numbers satisfying $0.9 \leq a \leq 1.1$, $1.9 \leq b \leq 2.2$, $5 \times 10^{-3} \leq x \leq 10^{-1}$, $0<w$, and $0<u+v+w \leq 4 \times 10^{-1}$, respectively.

5. The bivalent metal silicate phosphor according to claim 4, wherein said u, v and w are numbers satisfying the conditions of $0 \leq u \leq 2 \times 10^{-1}$, $0 \leq v \leq 10^{-1}$ and $0<w \leq 10^{-1}$, respectively.

6. A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in claim 4.

7. A bivalent metal silicate phosphor which has a basic composition represented by the formula $(Ca_{1-x-u}Eu_xM^{II}_u)O \cdot a(Mg_{1-v}Zn_v)O \cdot bSiO_2 \cdot wM^{III}$, oxide wherein $M^{II}$ is at least one metal element selected from the group consisting of barium (Ba) and strontium (Sr), $M^{III}$ is at least one metal element selected from the group consisting of lanthanum (La), yttrium (Y), cerium (Ce), indium (In) and bismuth (Bi), and a, b, x, u, v and w are numbers satisfying $0.9 \leq a \leq 1.1$, $1.9 \leq b \leq 2.2$, $5 \times 10^{-3} \leq x \leq 10^{-1}$ and $0 \leq u+v+w \leq 4 \times 10^{-1}$, respectively, and which contains chlorine.

8. The bivalent metal silicate phosphor according to claim 7, wherein the amount of chlorine contained in the phosphor is at most 20,000 ppm.

9. The bivalent metal silicate phosphor according to claim 7, wherein the weight median particle diameter D50 of the phosphor as measured by Coulter Counter Method is within a range of from 1 to 7 μm.

10. The bivalent metal silicate phosphor according to claim 9, wherein the weight median particle diameter D50 of the phosphor as measured by Coulter Counter Method is within a range of from 1 to 4 μm.

11. The bivalent metal silicate phosphor according to claim 9, wherein in the particle size distribution as measured by Coulter Counter Method, σ log (L) and σ log (S) are at most 0.5.

12. The bivalent metal silicate phosphor according to claim 7, wherein the relative blow off electrostatic charge to a poval resin would be positive electrification.

13. A process for producing a bivalent metal silicate phosphor as defined in claim 7, which comprises a step of baking the phosphor material at least once at a temperature of at least 800° C., wherein a chlorine compound or chlorine is incorporated into the phosphor material in that step.

14. The process for producing a bivalent metal silicate phosphor according to claim 13, wherein the amount of chlorine incorporated into the phosphor material is at least 0.001 wt %.

15. The process for producing a bivalent metal silicate phosphor according to claim 13, wherein ammonium chloride is used as the chlorine compound to be incorporated into the phosphor material.

16. A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in claim 7.

17. A bivalent metal silicate phosphor which has a basic composition represented by the formula $(Ca_{1-x-u}Eu_xM^{II}_u)O \cdot a(Mg_{1-v}Zn_v)O \cdot bSiO_2 \cdot wM^{III}$oxide$\cdot tCl$, wherein $M^{II}$ is at least one metal element selected from the group consisting of barium (Ba) and strontium (Sr), $M^{III}$ is at least one metal element selected from the group consisting of lanthanum (La), yttrium (Y), cerium (Ce), indium (In) and bismuth (Bi), and a, b, x, t, u, v and w are numbers satisfying $0.9 \leq a \leq 1.1$, $1.9 \leq b \leq 2.2$, $5 \times 10^{-3} \leq x \leq 10^{-1}$, $0 \leq t \leq 2 \times 10^{-1}$ and $0 \leq u+v+w \leq 4 \times 10^{-1}$, respectively, and which contains at least one of bromine and iodine.

18. The bivalent metal silicate phosphor according to claim 17, wherein the total amount of bromine and iodine contained in the phosphor is at most 20,000 ppm.

19. The bivalent metal silicate phosphor according to claim 17, wherein the weight median particle diameter D50 of the phosphor as measured by Coulter Counter Method is within a range of from 1 to 7 μm.

20. The bivalent metal silicate phosphor according to claim 19, wherein the weight median particle diameter D50 of the phosphor as measured by Coulter Counter Method is within a range of from 1 to 4 μm.

21. The bivalent metal silicate phosphor according to claim 19, wherein in the particle size distribution as measured by Coulter Counter Method, σ log (L) and σ log (S) are at most 0.5.

22. The bivalent metal silicate phosphor according to claim 17, wherein the relative blow off electrostatic charge to a poval resin would be positive electrification.

23. A process for producing a bivalent metal silicate phosphor as defined in claim 17, which comprises a step of baking the phosphor material at least once at a temperature of at least 800° C., wherein at least one member selected from the group consisting of bromine, iodine, a bromine compound and an iodine compound, is incorporated into the phosphor material in that step.

24. The process for producing a bivalent metal silicate phosphor according to claim 23, wherein the amount of bromine and iodine incorporated into the phosphor material is at least 0.001 wt %.

25. The process for producing a bivalent metal silicate phosphor according to claim 23, wherein ammonium bromide is used as the bromine compound, and ammonium iodide is used as the iodine compound, to be incorporated into the phosphor material.

26. A vacuum ultraviolet ray excitation type light-emitting device comprising an envelope, a phosphor layer formed inside of the envelope and a rare gas sealed in the envelope, so that the phosphor layer is excited by vacuum ultraviolet rays generated by discharge of the rare gas, wherein the phosphor layer is formed of a bivalent metal silicate phosphor as defined in claim 17.

* * * * *